United States Patent
Mani et al.

(10) Patent No.: US 8,046,602 B2
(45) Date of Patent: *Oct. 25, 2011

(54) CONTROLLING CONNECTION STATUS OF NETWORK ADAPTERS

(75) Inventors: Anbazhagan Mani, Karnataka (IN); Jorge Rafael Nogueras, Austin, TX (US); Ravindran Rajan, Karnataka (IN); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 764 days.

This patent is subject to a terminal disclaimer.

(21) Appl. No.: 12/037,161

(22) Filed: Feb. 26, 2008

(65) Prior Publication Data
US 2009/0217066 A1  Aug. 27, 2009

(51) Int. Cl.
*G06F 1/00* (2006.01)
(52) U.S. Cl. .................................................. 713/300
(58) Field of Classification Search .................. 713/300
See application file for complete search history.

(56) References Cited

U.S. PATENT DOCUMENTS

| | | | | |
|---|---|---|---|---|
| 5,900,026 A | * | 5/1999 | Ryu | 713/320 |
| 6,408,395 B1 | | 6/2002 | Sugahara et al. | 713/310 |
| 6,701,442 B1 | | 3/2004 | Kunz et al. | 713/300 |
| 6,931,555 B2 | | 8/2005 | Osborn | 713/320 |
| 7,272,735 B2 | | 9/2007 | Fung | 713/320 |
| 7,536,569 B2 | * | 5/2009 | Montero et al. | 713/300 |
| 2003/0063594 A1 | * | 4/2003 | Li et al. | 370/342 |
| 2007/0093124 A1 | * | 4/2007 | Varney et al. | 439/499 |
| 2007/0106920 A1 | | 5/2007 | Lee et al. | 713/320 |
| 2009/0072803 A1 | * | 3/2009 | Tiew et al. | 323/277 |

* cited by examiner

*Primary Examiner* — Mohammed H Rehman
(74) *Attorney, Agent, or Firm* — David A. Mims, Jr.; Robert V. Wilder

(57) ABSTRACT

A method, medium and implementing processing system are provided for controlling the number of Ethernet adapters connected in an EtherChannel depending upon the current bandwidth requirements of the system. This system reduces power consumption, inter alia, wherever possible while not sacrificing performance or flexibility of an EthernetChannel. An exemplary embodiment EtherChannel's total bandwidth utilization is monitored and controlled. When the bandwidth utilization is a predetermined amount less than or more than a predetermined threshold level, power supplied to one or more of the physical Ethernet adapters that are part of the EtherChannel is adjusted, i.e. reduced or increased, accordingly. In another embodiment, in systems where ethernet devices support different levels of power, the power supplied to one or more adapters can be systematically incrementally reduced or increased in response to reduced or increased bandwidth utilization.

17 Claims, 2 Drawing Sheets

CONTROLLING CONNECTION STATUS OF NETWORK ADAPTERS

FIELD OF THE INVENTION

The present invention relates generally to information processing systems and more particularly to a methodology and implementation for enabling a power-saving feature for network adapters.

BACKGROUND OF THE INVENTION

Computer system interconnection networks, including but not limited to the Internet, rely on an Ethernet system to enable communication between computer systems connected to each other through the network. EtherChannel and IEEE 802.3ad Link Aggregation are network port aggregation technologies that allow several physical Ethernet adapters to be aggregated together to form a single pseudo-Ethernet device. EtherChannel also supports load-balancing for outgoing traffic using two methods, i.e. "round-robin" and "standard".

It is desirable to reduce power consumption wherever possible while not sacrificing performance or flexibility. Both of the load-balancing options mentioned above do not focus on saving power.

Thus there is a need for an improved methodology and implementing system which controls adapter connectivity in an EtherChannel and provides a new solution to enable a reduction in power consumption on physical adapters when they are part of EtherChannel.

SUMMARY OF THE INVENTION

A method, medium and implementing processing system are provided for controlling the number of Ethernet adapters connected in an EtherChannel depending upon the current bandwidth requirements of the system. This system reduces power consumption, inter alia, wherever possible while not sacrificing performance or flexibility of an EthernetChannel. An exemplary embodiment uses the EtherChannel and adds a "power-saving" mode. When run in this mode, EtherChannel's total bandwidth utilization is monitored and controlled. The number of connected powered-up network adapters depends upon the bandwidth utilization. When the bandwidth utilization is a predetermined amount less than or more than a predetermined threshold level, power supplied to one or more of the physical Ethernet adapters that are part of the EtherChannel is adjusted, i.e. reduced or increased, accordingly. In another embodiment, in systems where ethernet devices support different levels of power, the power supplied to one or more adapters can be systematically incrementally reduced or increased in response to reduced or increased bandwidth utilization rather than a total powered-off or power-on of individual adapters.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
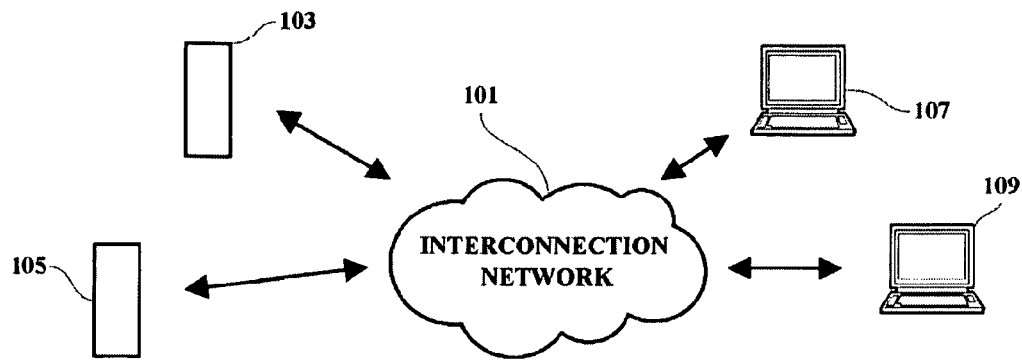
FIG. 1 is an illustration showing a networked computer system in which the present invention may be implemented.

The various methods discussed herein are illustrated as implemented within a server system but it is understood that the principles disclosed herein may also be implemented within any computer or communication system. Since the individual components of a system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a server system, it is understood that the principles of the invention may be implemented in any of many available and future communication devices and systems.

EtherChannel and IEEE 802.3ad Link Aggregation are network port aggregation technologies that allow several Ethernet adapters to be aggregated together to form a single pseudo Ethernet device. For example, ent0 and ent1 can be aggregated into an EtherChannel adapter called ent3; interface ent3 would then be configured with an IP address. The system considers these aggregated adapters as one adapter. Therefore, IP is configured over them as over any Ethernet adapter. In addition, all adapters in the EtherChannel or Link Aggregation are given the same media access controller (MAC) address, so they are treated by remote systems as if they were one adapter. Both EtherChannel and IEEE 802.3ad Link Aggregation require support in the switch so these two technologies are aware which switch ports should be treated as one.

The main benefit of EtherChannel and IEEE 802.3ad Link Aggregation is that they have the network bandwidth of all of their adapters in a single network presence. If an adapter fails, network traffic is automatically sent on the next available adapter without disruption to existing user connections. The adapter is automatically returned to service on the EtherChannel or Link Aggregation when it recovers.

The present disclosure enables a power saving feature in networked devices by selectively switching off physical ethernet adapters when the utilization of the EtherChannel is low. As part of this solution, EtherChannel will have another mode called "power-saving" mode. When run in this mode, EtherChannel's total band-width utilization will be monitored and when the utilization is less (for example only 10% of the total capacity), one or more of the physical ethernet adapters that are part of the EtherChannel in one embodiment, will be powered-off using software control or hardware control. An example scenario could be an EtherChannel (interface en3) which is formed out of three physical Ethernet adapters (representing interface en0, en1 and en2). Each of the three physical adapters can support a maximum band-width of 1 GB. So, potentially the EtherChannel could support ~3 GBps aggregate bandwidth. However, when EtherChannel utilization is so low (for example packets are sent and received at 20 MBps average rate on en3), en1 and en2 will be powered off until the utilization shows increase. By switching off the two physical ethernet adapters, power consumption can be saved. The adapters can be switched-on again by using, for example, soft-control, when there is an increase in utilization.

Existing adapter arrangements may be easily modified to implement this power-saving feature. While switching off the physical adapters, adapter membership within the EtherChannel is maintained, so that adapter remains virtually locked and will not be allowed to be used for other purposes by the user or other applications. In some systems, commands implementation will be modified to support this feature. If the user wants to use the adapter for other purposes, it can be detached from the EtherChannel by explicit commands.

Since one of the purpose of EtherChannel is to provide fail-over, another advanced mode can be added on top of "power-saving" mode called "power-saving fail-over" mode. This "power-saving fail-over" mode will make sure there is scope for fail-over as well as power saving. In the same example scenario above, instead of switching off two physical adapters, only 1 physical adapter (interface en2) will be powered off. Both en0 and en1 will be active and in case of any failure of one of the physical adapters, the other physical adapters will carry the network traffic.

By using predictive modeling, this invention limits performance degradation and also leaves some scope for handling spike in Ethernet traffic while switching on network ports which may in "switched off" state. Several advanced predictive modeling algorithms like naive Bayes classifier (http://en.wikipedia.org/wiki/Naive_Bayes_classifier) can be used to predict utilization behavior to ensure performance degradation does not occur. Another variation of this invention is the reducing of power to the Ethernet device instead of completely switching it off, since many Ethernet devices support different levels of power.

With specific reference to the drawings, in FIG. 1 there is shown an exemplary networked system in which a plurality of user computer systems 107, 109 are interconnected through an interconnection network 101, such as the Internet, to each other and also to various server systems 103 and 105. Each of the communication or computer devices 103-109 is enabled to transmit and receive information to and from any of the other devices connected to the network 101 through an Ethernet adapter as shown in greater detail in FIG. 2.

Figure 2:
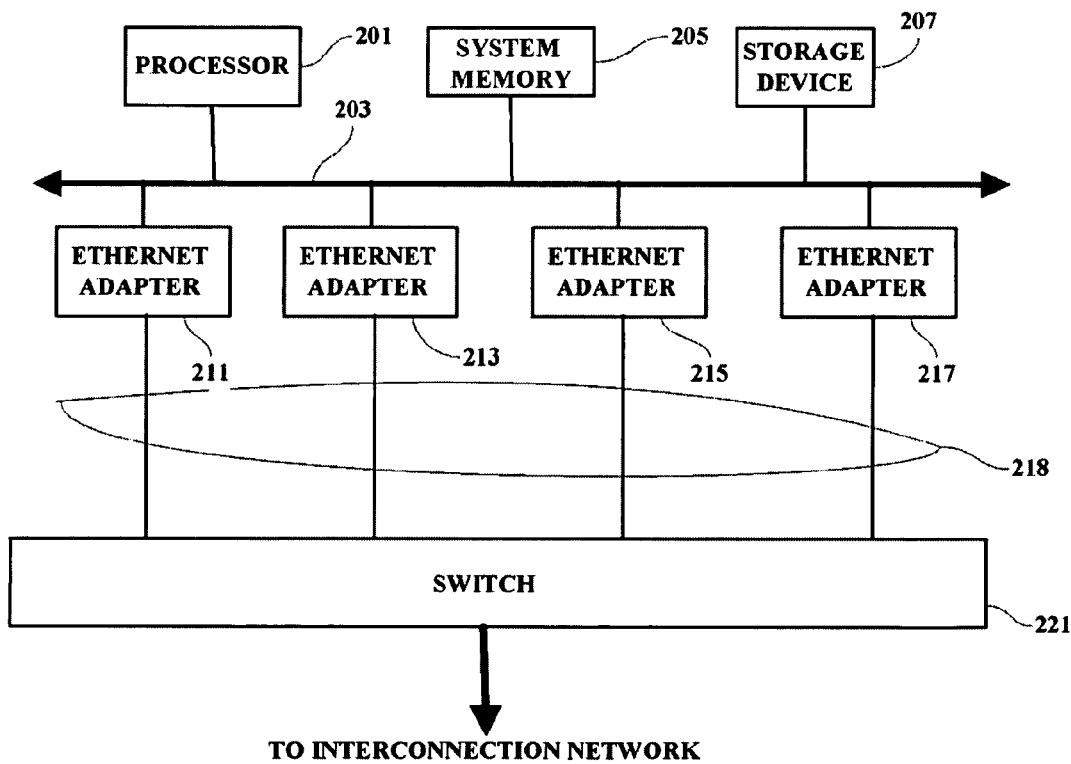
FIG. 2 is a block diagram showing several of the major components of one of the exemplary computer systems shown in FIG. 1.

Several of the major components of an exemplary one of the computer systems shown in FIG. 1 are illustrated in FIG. 2. As shown in FIG. 2, a server system for example, includes a processor system 201 connected to a main bus 203. The system also includes, inter alia, a system memory 205 and system storage 207. The server 103 for example, communicates with the other systems in the network through a series of Ethernet Adapters 211, 213, 215 and 217, which together comprise the EtherChannel 218. In accordance with the present invention, efficient use of the Ethernet Adapters is accomplished by monitoring the bandwidth usage of the EtherChannel and controlling the use of the individual Ethernet Adapters in response to the detected total EtherChannel bandwidth usage. For example, if the actual bandwidth usage is below a predetermined percentage of total bandwidth capacity of the total EtherChannel 218, then one or more of the adapters 211-217 may be powered-down or powered-off and that adapter would be switched out of the EtherChannel through the use of a switching device 221.

Figure 3:
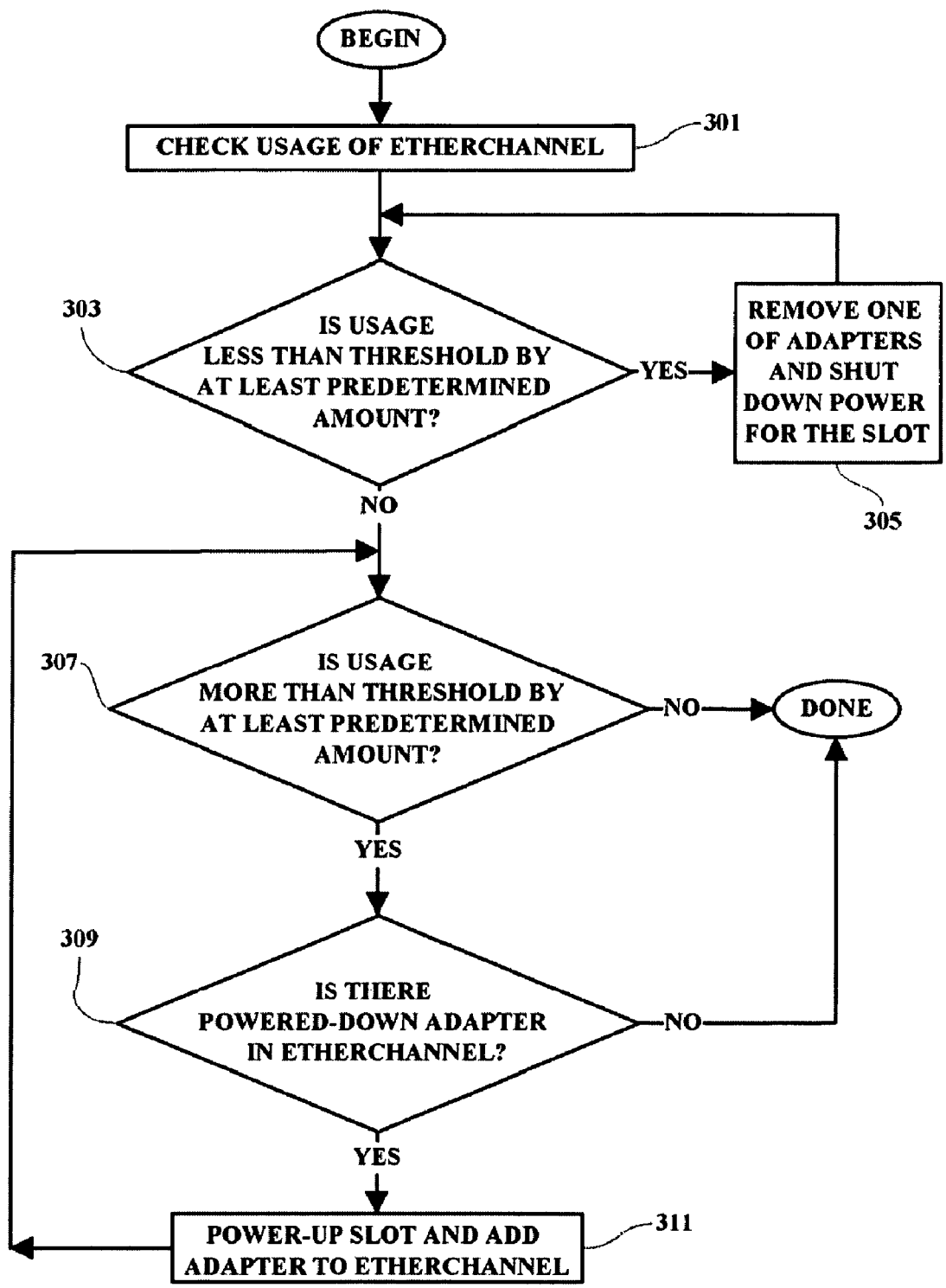
FIG. 3 is a flow chart illustrating an operational sequence of an exemplary embodiment of the present invention.

FIG. 3 shows a flow chart illustrating an operational sequence of an exemplary embodiment of the present invention. As shown, when the power-saving function is invoked, the actual bandwidth usage of the EtherChannel 218 is checked 301 and if the actual usage is below a predetermined threshold 303 by at least a predetermined amount, then one of the adapters 211-217 is powered-down and removed 305 from the EtherChannel 218. In the example, this process continues until the actual bandwidth usage is not less than a predetermined threshold by at least a predetermined amount 303. When the actual usage is not less than a predetermined threshold level 303, a check is made to determine if the actual bandwidth usage is greater than a threshold level by at least a predetermined amount 307. If that is not the case, the process is completed until the power-saving function is again initiated. If it is determined that the actual bandwidth usage id greater than a predetermined threshold by at least a predetermined amount 307, then a check is made to determine if there is a powered-down adapter available in the EtherChannel 309 that can be re-energized or powered-up 311 and added to the EtherChannel to help carry the detected higher bandwidth usage. This process may be continued 307 until either the usage is not greater than the predetermined threshold usage 307 or until all available EtherChannel adapters have been powered-up and connected into the EtherChannel and no more EtherNet adapters are available 309, at which time the processing is ended. Of course, the power-saving process may run continuously or may be executed only on call as shown.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including portable or fixed, volatile or non-volatile memory media device, including CDs, RAM and "Flash" memory, or other semiconductor, optical, magnetic or other memory storage media from which it may be loaded and/or transmitted into other media and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for controlling network adapter connectivity in an EtherChannel, said EtherChannel including a number of network adapters, said method comprising:
monitoring bandwidth utilization by said EtherChannel; and
incrementally changing a power level applied to one or more of said number of network adapters connected in said EtherChannel depending upon said bandwidth utilization of said EtherChannel, said method further including maintaining power to one or more fail-over network adapters in addition to a number determined to be necessary for bandwidth utilization, said fail-over network adapters being configured to carry network traffic in an event of a failure of one other of said network adapters.

2. The method as set forth in claim 1 wherein said power level applied to one or more of said number of network adapters connected is incrementally reduced when said bandwidth utilization is monitored to be less than a predetermined threshold level.

3. The method as set forth in claim 1 wherein said power level applied to one or more of said number of network adapters connected is incrementally increased when said bandwidth utilization is monitored to be greater than a predetermined threshold level.

4. The method as set forth in claim 1 wherein power to at least one of said number of network adapters in said EtherChannel is disconnected when said bandwidth utilization of said EtherChannel is monitored to be less than a predetermined threshold level.

5. The method as set forth in claim 1 wherein power to a disconnected one of said number of network adapters in said EtherChannel is applied when said bandwidth utilization is monitored to be greater than a predetermined threshold level.

6. The method as set forth in claim 1 wherein power to at least one of said number of network adapters in said EtherChannel is incrementally decreased when said bandwidth utilization of said EtherChannel is monitored to be less than a predetermined threshold level.

7. A computer program product comprising a computer-readable, non-transitory, tangible storage device(s) and computer-readable program instructions stored on the computer-readable, non-transitory, tangible storage device(s) for controlling network adapter connectivity in an EtherChannel, said EtherChannel including a number of network adapters in a computer system, the computer-readable program instructions, when executed by a processor, being operable for implementing a method comprising:
monitoring bandwidth utilization by said EtherChannel; and
incrementally changing a power level applied to one or more of said number of network adapters connected in said EtherChannel depending upon said bandwidth utilization of said EtherChannel, said method further including maintaining power to one or more fail-over network adapters in addition to a number determined to be necessary for bandwidth utilization, said fail-over network adapters being configured to carry network traffic in an event of a failure of one other of said network adapters.

8. The computer program product as set forth in claim 7 wherein said power level applied to one or more of said number of network adapters connected is incrementally reduced when said bandwidth utilization is monitored to be less than a predetermined threshold level.

9. The computer program product as set forth in claim 7 wherein said power level applied to one or more of said number of network adapters connected is incrementally increased when said bandwidth utilization is monitored to be greater than a predetermined threshold level.

10. The computer program product as set forth in claim 7 wherein power to at least one of said number of network adapters in said EtherChannel is disconnected when said bandwidth utilization of said EtherChannel is monitored to be less than a predetermined threshold level.

11. The computer program product as set forth in claim 7 wherein power to a disconnected one of said number of network adapters in said EtherChannel is applied when said bandwidth utilization is monitored to be greater than a predetermined threshold level.

12. The computer program product as set forth in claim 7 wherein power to at least one of said number of network adapters in said EtherChannel is incrementally decreased when said bandwidth utilization of said EtherChannel is monitored to be less than a predetermined threshold level.

13. A system for controlling network adapter connectivity in an EtherChannel, said EtherChannel including a number of network adapters in a computer system, said system comprising:
a system bus;
a number of network adapters connected in an EtherChannel configuration;
a switching means connecting said network adapters to said system bus, said switching means being arranged to control a connectivity of individual ones of said network adapters in said EtherChannel; and
monitoring means for determining bandwidth utilization by said EtherChannel, said switching means being responsive to said bandwidth utilization for incrementally changing a power level applied to one or more of said number of network adapters connected in said EtherChannel depending upon said bandwidth utilization of said EtherChannel, said system further including means for maintaining power to one or more fail-over network adapters in addition to a number determined to be necessary for bandwidth utilization, said fail-over network adapters being configured to carry network traffic in an event of a failure of one other of said network adapters.

14. The system as set forth in claim 13 wherein said power level applied to one or more of said number of network adapters connected is incrementally reduced when said bandwidth utilization is monitored to be less than a predetermined threshold level.

15. The system as set forth in claim 13 wherein said power level applied to one or more of said number of network adapters connected is incrementally increased when said bandwidth utilization is monitored to be greater than a predetermined threshold level.

16. The system as set forth in claim 13 wherein power to at least one of said number of network adapters in said EtherChannel is disconnected when said bandwidth utilization of said EtherChannel is monitored to be less than a predetermined threshold level.

17. The system as set forth in claim 13 wherein power to a disconnected one of said number of network adapters in said EtherChannel is applied when said bandwidth utilization is monitored to be greater than a predetermined threshold level.

* * * * *